(No Model.)

E. HERRINGTON & R. I. BUTLER.
VELOCIPEDE.

No. 515,428. Patented Feb. 27, 1894.

Witnesses
A. Ruppert
H. A. Daniels

Inventors.
Ephraim Herrington
Reuben I. Butler
Per Thomas P. Simpson
Attorney

UNITED STATES PATENT OFFICE.

EPHRAIM HERRINGTON AND REUBEN I. BUTLER, OF ATLANTA, GEORGIA, ASSIGNORS TO ALFRED F. GREEN, ROBERT P. HORTON, AND SAID HERRINGTON, ALL OF SAME PLACE.

VELOCIPEDE.

SPECIFICATION forming part of Letters Patent No. 515,428, dated February 27, 1894.

Application filed May 10, 1893. Serial No. 473,745. (No model.)

*To all whom it may concern:*

Be it known that we, EPHRAIM HERRINGTON and REUBEN I. BUTLER, citizens of the United States of America, residing at Atlanta, in the county of Fulton and State of Georgia, have invented certain new and useful Improvements in Velocipedes, of which the following is a specification, reference being had therein to the accompanying drawings.

This invention relates to velocipedes and consists in certain improvements in the construction of the same, as hereinafter described and claimed.

Figure 1:
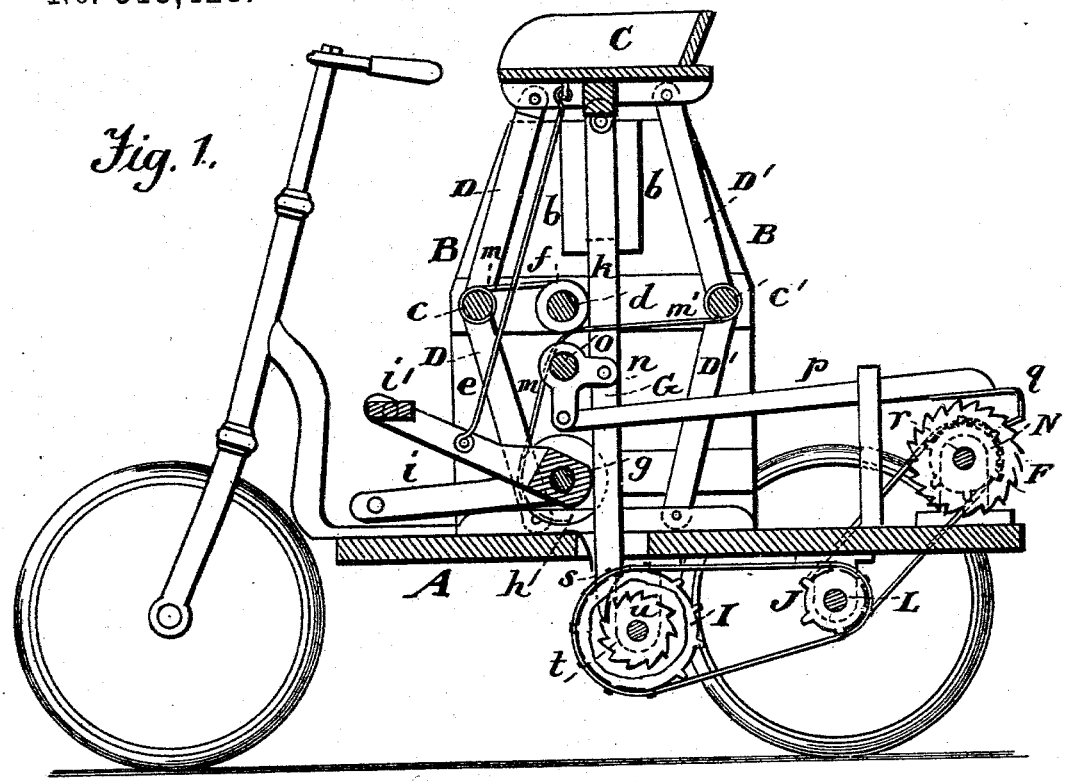
Figure 2:
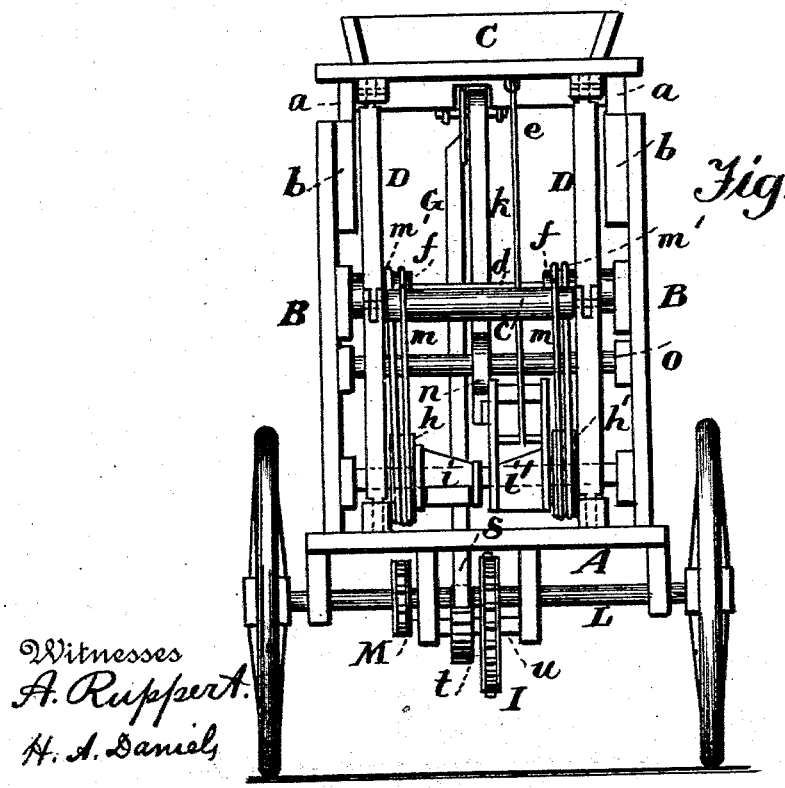

In the accompanying drawings Figure 1 represents a sectional, side view of a tricycle having our improvements applied thereto. Fig. 2 illustrates the mechanism of the tricycle in rear view.

A designates the body of the vehicle and B the opposite side standards on which is mounted a seat C for the rider. The said seat is loosely connected with the standards by means of two vertical pieces $a$ extending downward from the seat between guides $b$ made fast to the standards, so that the seat may have a vertical movement as hereinafter set forth.

D indicates the forward, and D' the rearward toggle-arms, the upper ends of which are pivotally connected with the seat C, the lower ends being pivotally connected with the floor or platform of the vehicle as shown. The front toggles D are connected at their pivotal joints by a rung or roller $c$, and the rear toggles D' are in like manner connected by a rung or roller $c'$. A shaft $d$ has its bearings in the sides B, and on said shaft are formed or secured two pulleys $f$. Another shaft $g$ is journaled in bearings carried by the sides B, near the floor of the vehicle; on said shaft $g$, are mounted two pulleys $h$ and $h'$, and two pedals $i$ and $i'$ are connected with said shaft and extend forward therefrom. The pulley $h$, and the pedal $i$ are fast on the shaft $g$, and while the pulley and pedal $i'$ are loose on said shaft the latter being connected by a wire or rod $e$ with the seat C. Cords $m$ are attached to the roller $c$ of the forward toggles and passed over and about the pulleys $f$, and thence downward to the pulleys $h$, $h'$, and secured thereto; and cords $m'$ are attached to the roller $c'$ of the rear toggles and passed under and about said pulleys $f$, and downward to said pulleys $h$ $h'$ and attached thereto. When the operator presses downward the pedal $i$, the pulleys $h$, $h'$, being thereby partially rotated, the cords $m$, $m'$ are drawn so that the front and rear toggles are drawn toward each other, thus raising somewhat the seat C; the pedal $i$ being released and the pedal $i'$ being pressed downward, the seat is lowered and the toggles are expanded again the seat being brought down to rest on the side standards, the movement being assisted by the weight of the rider. A connecting rod $k$ extends down from the seat C and connects said seat with one end of an elbow $n$, secured to a shaft $o$, the other end of said elbow being connected with a bar or rod $p$ which extends rearward and has a grab or pawl $q$ in position to engage a ratchet wheel F, on a shaft $r$, mounted in bearings on the rear part of the machine.

G indicates a rod or bar, connected at its upper end with the seat C and extending down through the floor or platform of the vehicle. A pawl $s$ is carried by the rod G, and is in position to connect with a ratchet wheel $t$, on a shaft $u$ which is mounted in bearings secured to the body of the vehicle. On said shaft $u$ is a chain wheel I, which is connected by chain-belt with a chain wheel J on an axle L of the vehicle, and on said axle may be secured another chain-wheel M, which may be connected with a similar wheel N on the shaft $r$.

As before stated, the rider's seat is raised by the front and rear toggle arms when drawn toward each other by the cords $m$, $m'$; the upward movement of the seat raises the rod $k$ and actuates the elbow $n$, pushing rearward the rod $p$ with its pawl in position to connect with ratchet wheel F on shaft $r$. Such upward movement also raises the rod G with pawl $s$ in position to connect with ratchet wheel $t$ on the shaft $u$. As the seat makes its downward movement, the rider pressing the pedal $i'$, the movement of the elbow $n$ is reversed, drawing inward the rod $p$, rotating shaft $r$, through the ratchet wheel F and pawl. The rod G with pawl $s$, also moves downward, rotating shaft $u$ through the ratchet wheel $t$.

By means of chain gearing power is communicated to the axle L from each of the shafts $r$ and $u$.

We claim—

1. The combination, with the body of a velocipede, of a seat mounted thereon, toggle arms, connected with said seat, cords connected with said toggle arms and passed about pulleys, a shaft provided with two pulleys with which said cords are connected, two pedals connected with said shaft, one of which is fast thereon, the other being connected by wire with said seat, and driving mechanism connected with said seat, substantially as set forth and described.

2. The combination with the body of a velocipede, of an axle and ground wheels, a vertically movable seat, devices for raising and lowering said seat, an elbow mounted on a shaft and connected by a rod with said seat, a ratchet wheel on a rotative shaft, a pawl in position to connect with said ratchet wheel, said pawl being connected by a rod with said elbow, and gearing connecting the shaft of said ratchet wheel with said axle, substantially as set forth and described.

3. The combination with the body of a velocipede, having side standards provided with guides $b$, of a vertically movable seat having fixed pieces $a$, extending down between said guides, toggle arms D, D', connected with said seat and with the body of the vehicle, a shaft $d$ with pulleys $f$, a shaft $g$ with fast pulleys $h$, $h'$, the loose pedal $i'$ connected by a wire with the seat, cords connected with toggle arms and passed about pulleys $f$ and connected with pulleys $h$ $h'$, and driving mechanism having connections with said seat, substantially as set forth and described.

In testimony whereof we have affixed our signatures in presence of two witnesses.

EPHRAIM HERRINGTON.
REUBEN I. BUTLER.

Witnesses:
A. F. GREEN,
A. P. WOOD.